United States Patent
Naik

(10) Patent No.: US 9,752,818 B2
(45) Date of Patent: Sep. 5, 2017

(54) UMBILICAL FOR PASS THROUGH IN VACUUM INSULATED REFRIGERATOR STRUCTURES

(71) Applicant: WHIRLPOOL CORPORATION, Benton Harbor, MI (US)

(72) Inventor: Abhay Naik, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 14/978,843

(22) Filed: Dec. 22, 2015

(65) Prior Publication Data
US 2017/0176092 A1 Jun. 22, 2017

(51) Int. Cl.
| | |
|---|---|
| F25D 23/06 | (2006.01) |
| F25D 23/02 | (2006.01) |
| F16L 7/00 | (2006.01) |
| H02G 3/04 | (2006.01) |
| H02G 1/00 | (2006.01) |

(52) U.S. Cl.
CPC ............ F25D 23/061 (2013.01); F16L 7/00 (2013.01); F25D 23/028 (2013.01); H02G 1/00 (2013.01); H02G 3/0481 (2013.01); F25D 2201/1262 (2013.01); F25D 2400/40 (2013.01)

(58) Field of Classification Search
CPC ......... F16L 23/061; F16L 7/00; F25D 23/028; H02G 1/00; H02G 3/0418
USPC .......................................................... 174/24
See application file for complete search history.

(56) References Cited

U.S. PATENT DOCUMENTS

| | | |
|---|---|---|
| 948,541 A | 2/1910 | Coleman |
| 1,275,511 A | 8/1918 | Welch |
| 2,108,212 A | 2/1938 | Schellens |
| 2,128,336 A | 8/1938 | Torstensson |

(Continued)

FOREIGN PATENT DOCUMENTS

| | | |
|---|---|---|
| CA | 1320631 | 7/1993 |
| CA | 2259665 A1 | 1/1998 |

(Continued)

OTHER PUBLICATIONS

"International Searching Authority, "Search Report," issued in connection with International Patent Application No. PCT/US2016/062479, dated Feb. 9, 2017, 8 pages."

(Continued)

Primary Examiner — Timothy Thompson
Assistant Examiner — Charles Pizzuto
(74) Attorney, Agent, or Firm — Price Heneveld LLP

(57) ABSTRACT

A method of routing utility lines in a vacuum insulated refrigerator structure includes forming a shell and an elongated umbilical comprising an elongated impervious sleeve and a core structure defining at least two elongated internal passageways extending lengthwise along the umbilical. The method includes sealingly connecting a first end of the sleeve to the shell at a first opening, and sealingly connecting a second end of the sleeve to the shell at a second opening. A vacuum is formed in an internal cavity of the shell. Utility lines are routed through at least one of the elongated internal passageways whereby portions of the utility lines are disposed inside the umbilical, and opposite ends of the utility lines extend out of the opposite ends of the umbilical.

20 Claims, 6 Drawing Sheets

(56) References Cited

U.S. PATENT DOCUMENTS

| | | | |
|---|---|---|---|
| 2,164,143 A | 6/1939 | Munters | |
| 2,318,744 A | 5/1943 | Brown | |
| 2,356,827 A | 8/1944 | Coss et al. | |
| 2,439,602 A | 4/1948 | Heritage | |
| 2,439,603 A | 4/1948 | Heritage | |
| 2,538,780 A | 1/1951 | Hazard | |
| 2,559,356 A | 7/1951 | Hedges | |
| 2,729,863 A | 1/1956 | Kurtz | |
| 2,768,046 A | 10/1956 | Evans | |
| 2,817,123 A | 12/1957 | Jacobs | |
| 2,942,438 A | 6/1960 | Schmeling | |
| 2,985,075 A | 5/1961 | Knutsson-Hall | |
| 3,086,830 A | 4/1963 | Malia | |
| 3,125,388 A | 3/1964 | Costantini et al. | |
| 3,137,900 A | 6/1964 | Carbary | |
| 3,218,111 A | 11/1965 | Steiner | |
| 3,258,883 A | 7/1966 | Campanaro et al. | |
| 3,281,510 A * | 10/1966 | Lovret | B29C 44/30 264/209.2 |
| 3,358,059 A | 12/1967 | Snyder | |
| 3,379,481 A | 4/1968 | Fisher | |
| 3,471,416 A | 10/1969 | Fijal | |
| 3,635,536 A | 1/1972 | Lackey et al. | |
| 3,688,384 A | 9/1972 | Mizushima et al. | |
| 4,006,947 A | 2/1977 | Haag et al. | |
| 4,043,624 A | 8/1977 | Lindenschmidt | |
| 4,050,145 A | 9/1977 | Benford | |
| 4,067,628 A | 1/1978 | Sherburn | |
| 4,325,734 A | 4/1982 | Burrage et al. | |
| 4,332,429 A | 6/1982 | Frick et al. | |
| 4,417,382 A | 11/1983 | Schilf | |
| 4,492,368 A | 1/1985 | DeLeeuw et al. | |
| 4,548,196 A | 10/1985 | Torobin | |
| 4,660,271 A | 4/1987 | Lenhardt | |
| 4,671,909 A | 6/1987 | Torobin | |
| 4,671,985 A | 6/1987 | Rodrigues et al. | |
| 4,745,015 A | 5/1988 | Cheng et al. | |
| 4,777,154 A | 10/1988 | Torobin | |
| 4,805,293 A | 2/1989 | Buchser | |
| 4,917,841 A | 4/1990 | Jenkins | |
| 5,007,226 A | 4/1991 | Nelson | |
| 5,018,328 A | 5/1991 | Cur et al. | |
| 5,033,636 A | 7/1991 | Jenkins | |
| 5,066,437 A | 11/1991 | Barito et al. | |
| 5,082,335 A | 1/1992 | Cur et al. | |
| 5,094,899 A | 3/1992 | Rusek, Jr. | |
| 5,118,174 A | 6/1992 | Benford et al. | |
| 5,157,893 A | 10/1992 | Benson et al. | |
| 5,175,975 A | 1/1993 | Benson et al. | |
| 5,212,143 A | 5/1993 | Torobin | |
| 5,221,136 A | 6/1993 | Hauck et al. | |
| 5,231,811 A | 8/1993 | Andrepont et al. | |
| 5,248,196 A | 9/1993 | Lynn et al. | |
| 5,252,408 A | 10/1993 | Bridges et al. | |
| 5,263,773 A | 11/1993 | Gable et al. | |
| 5,273,801 A | 12/1993 | Barry et al. | |
| 5,318,108 A | 6/1994 | Benson et al. | |
| 5,340,208 A | 8/1994 | Hauck et al. | |
| 5,342,097 A * | 8/1994 | Hanson | F16L 39/00 285/121.1 |
| 5,353,868 A | 10/1994 | Abbott | |
| 5,359,795 A | 11/1994 | Mawby et al. | |
| 5,397,759 A | 3/1995 | Torobin | |
| 5,418,055 A | 5/1995 | Chen et al. | |
| 5,433,056 A | 7/1995 | Benson et al. | |
| 5,477,676 A | 12/1995 | Benson et al. | |
| 5,507,999 A | 4/1996 | Copsey et al. | |
| 5,509,248 A | 4/1996 | Dellby et al. | |
| 5,512,345 A | 4/1996 | Tsusumi et al. | |
| 5,562,154 A | 10/1996 | Benson et al. | |
| 5,586,680 A | 12/1996 | Dellby et al. | |
| 5,632,543 A | 5/1997 | McGrath et al. | |
| 5,640,828 A | 6/1997 | Reeves et al. | |
| 5,643,485 A | 7/1997 | Potter et al. | |
| 5,652,039 A | 7/1997 | Tremain et al. | |
| 5,716,581 A | 2/1998 | Tirell et al. | |
| 5,813,454 A | 9/1998 | Potter | |
| 5,827,385 A | 10/1998 | Meyer et al. | |
| 5,843,353 A | 12/1998 | Devos et al. | |
| 5,866,228 A | 2/1999 | Awata | |
| 5,868,890 A | 2/1999 | Fredrick | |
| 5,900,299 A | 5/1999 | Wynne | |
| 5,924,295 A | 7/1999 | Park | |
| 5,966,963 A | 10/1999 | Kovalaske | |
| 5,985,189 A | 11/1999 | Lynn et al. | |
| 6,094,922 A | 8/2000 | Ziegler | |
| 6,109,712 A | 8/2000 | Haworth et al. | |
| 6,128,914 A | 10/2000 | Tamaoki et al. | |
| 6,132,837 A | 10/2000 | Boes et al. | |
| 6,158,233 A | 12/2000 | Cohen et al. | |
| 6,164,030 A | 12/2000 | Dietrich | |
| 6,220,473 B1 | 4/2001 | Lehman et al. | |
| 6,221,456 B1 | 4/2001 | Pogorski et al. | |
| 6,224,179 B1 | 5/2001 | Wenning et al. | |
| 6,260,377 B1 | 7/2001 | Tamaoki et al. | |
| 6,305,768 B1 | 10/2001 | Nishimoto | |
| 6,390,378 B1 | 5/2002 | Briscoe, Jr. et al. | |
| 6,406,449 B1 | 6/2002 | Moore et al. | |
| 6,408,841 B1 | 6/2002 | Hirath et al. | |
| 6,415,623 B1 | 7/2002 | Jennings et al. | |
| 6,460,955 B1 | 10/2002 | Vaughan et al. | |
| 6,623,413 B1 | 9/2003 | Wynne | |
| 6,716,501 B2 | 4/2004 | Kovalchuk et al. | |
| 6,749,780 B2 | 6/2004 | Tobias | |
| 6,773,082 B2 | 8/2004 | Lee | |
| 6,858,280 B2 | 2/2005 | Allen et al. | |
| 6,938,968 B2 | 9/2005 | Tanimoto et al. | |
| 7,026,054 B2 | 4/2006 | Ikegawa et al. | |
| 7,210,308 B2 | 5/2007 | Tanimoto et al. | |
| 7,284,390 B2 | 10/2007 | Van Meter et al. | |
| 7,296,432 B2 | 11/2007 | Muller et al. | |
| 7,316,125 B2 | 1/2008 | Uekado et al. | |
| 7,343,757 B2 | 3/2008 | Egan et al. | |
| 7,449,227 B2 | 11/2008 | Echigoya et al. | |
| 7,625,622 B2 | 12/2009 | Teckoe et al. | |
| 7,641,298 B2 | 1/2010 | Hirath et al. | |
| 7,762,634 B2 | 7/2010 | Tenra et al. | |
| 7,815,269 B2 | 10/2010 | Wenning et al. | |
| 7,842,269 B2 | 11/2010 | Schachtely et al. | |
| 7,861,538 B2 | 1/2011 | Welle et al. | |
| 7,886,559 B2 | 2/2011 | Hell et al. | |
| 7,893,123 B2 | 2/2011 | Luisi | |
| 7,908,873 B1 | 3/2011 | Cur et al. | |
| 7,930,892 B1 | 4/2011 | Vonderhaar | |
| 8,113,604 B2 | 2/2012 | Olson et al. | |
| 8,117,865 B2 | 2/2012 | Allard et al. | |
| 8,163,080 B2 | 4/2012 | Meyer et al. | |
| 8,176,746 B2 | 5/2012 | Allard et al. | |
| 8,202,599 B2 * | 6/2012 | Henn | E04B 1/803 428/69 |
| 8,211,523 B2 | 7/2012 | Fujimori et al. | |
| 8,281,558 B2 | 10/2012 | Heimeyer et al. | |
| 8,343,395 B2 | 1/2013 | Hu et al. | |
| 8,353,177 B2 | 1/2013 | Adamski et al. | |
| 8,456,040 B2 | 6/2013 | Allard et al. | |
| 8,528,284 B2 | 9/2013 | Aspenson et al. | |
| 8,739,568 B2 | 6/2014 | Allard et al. | |
| 8,752,918 B2 | 6/2014 | Kang | |
| 8,770,682 B2 | 7/2014 | Lee et al. | |
| 8,852,708 B2 | 10/2014 | Kim et al. | |
| 9,463,917 B2 * | 10/2016 | Wu | B29C 51/02 |
| 2002/0168496 A1 | 11/2002 | Morimoto et al. | |
| 2003/0008100 A1 | 1/2003 | Horn | |
| 2004/0178707 A1 | 9/2004 | Avendano | |
| 2004/0180176 A1 | 9/2004 | Rusek | |
| 2004/0253406 A1 | 12/2004 | Hayashi et al. | |
| 2005/0235682 A1 | 10/2005 | Hirai et al. | |
| 2006/0076863 A1 | 4/2006 | Echigoya et al. | |
| 2006/0201189 A1 | 9/2006 | Adamski et al. | |
| 2006/0263571 A1 | 11/2006 | Tsunetsugu et al. | |
| 2007/0001563 A1 | 1/2007 | Park et al. | |
| 2007/0099502 A1 | 5/2007 | Ferinauer | |
| 2007/0176526 A1 | 8/2007 | Gomoll et al. | |
| 2008/0300356 A1 | 12/2008 | Meyer et al. | |

(56) References Cited

U.S. PATENT DOCUMENTS

| | | |
|---|---|---|
| 2008/0309210 A1 | 12/2008 | Luisi et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0179541 A1 | 7/2009 | Smith et al. |
| 2009/0324871 A1 | 12/2009 | Henn |
| 2010/0170279 A1 | 7/2010 | Aoki |
| 2010/0231109 A1 | 9/2010 | Matzke et al. |
| 2010/0293984 A1 | 11/2010 | Adamski et al. |
| 2010/0293987 A1* | 11/2010 | Horst ............... F25D 23/00 62/440 |
| 2010/0295435 A1 | 11/2010 | Kendall et al. |
| 2011/0030894 A1 | 2/2011 | Tenra et al. |
| 2011/0095669 A1* | 4/2011 | Moon ............... F25D 23/02 312/405 |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0315693 A1 | 12/2011 | Cur et al. |
| 2012/0000234 A1 | 1/2012 | Adamski et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCracken |
| 2012/0273111 A1 | 11/2012 | Nomura et al. |
| 2012/0279247 A1 | 11/2012 | Katu et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0033163 A1 | 2/2013 | Kang |
| 2013/0068990 A1 | 3/2013 | Eilbracht et al. |
| 2013/0111941 A1 | 5/2013 | Yu et al. |
| 2013/0255304 A1* | 10/2013 | Cur ............... F25D 23/062 62/338 |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 | 10/2013 | Wu et al. |
| 2013/0305535 A1 | 11/2013 | Cur et al. |
| 2014/0132144 A1 | 5/2014 | Kim et al. |
| 2014/0171578 A1 | 6/2014 | Meyer et al. |
| 2014/0260332 A1 | 9/2014 | Wu |
| 2014/0346942 A1 | 11/2014 | Kim et al. |
| 2014/0364527 A1 | 12/2014 | Wintermantel et al. |
| 2015/0027628 A1 | 1/2015 | Cravens et al. |
| 2015/0147514 A1 | 5/2015 | Shinohara et al. |
| 2015/0168050 A1 | 6/2015 | Cur et al. |

FOREIGN PATENT DOCUMENTS

| | | |
|---|---|---|
| CA | 2640006 A1 | 8/2007 |
| CN | 1158509 A | 4/2002 |
| CN | 100359272 A | 12/2005 |
| CN | 1970185 A | 5/2007 |
| CN | 101437756 A | 5/2009 |
| CN | 201680116 U | 12/2010 |
| CN | 102296714 A | 12/2011 |
| CN | 102452522 A | 5/2012 |
| CN | 102720277 A | 10/2012 |
| CN | 103072321 A | 5/2013 |
| CN | 203331442 U | 12/2013 |
| DE | 1150190 B | 6/1963 |
| DE | 19818890 A1 | 11/1999 |
| DE | 19915311 A1 | 10/2000 |
| DE | 102010024951 A1 | 12/2011 |
| DE | 102012223536 A1 | 6/2014 |
| DE | 102012223541 A1 | 6/2014 |
| EP | 3260699 A2 | 3/1988 |
| EP | 3480451 A1 | 4/1992 |
| EP | 3691518 A1 | 1/1996 |
| EP | 3860669 A1 | 8/1998 |
| EP | 1087186 A2 | 3/2001 |
| EP | 1200785 A1 | 5/2002 |
| EP | 1243880 A1 | 9/2002 |
| EP | 1484563 A1 | 12/2004 |
| EP | 1496322 A1 | 1/2005 |
| EP | 1505359 A1 | 2/2005 |
| EP | 2342511 A2 | 7/2011 |
| EP | 2607073 A2 | 6/2013 |
| EP | 2789951 A1 | 10/2014 |
| FR | 2980963 A1 | 4/2014 |
| GB | 337929 A | 6/1960 |
| GB | 1214548 A | 12/1970 |
| JP | 51057777 | 5/1976 |
| JP | 59191588 | 12/1984 |
| JP | 33013779 A | 1/1991 |
| JP | 06159922 A | 6/1994 |
| JP | 7001479 | 1/1995 |
| JP | H07167377 A | 7/1995 |
| JP | 08300052 | 11/1996 |
| JP | H08303686 A | 11/1996 |
| JP | H09166271 A | 6/1997 |
| JP | 10113983 | 5/1998 |
| JP | 11311395 | 11/1999 |
| JP | 11336990 | 12/1999 |
| JP | 2000097390 | 4/2000 |
| JP | 2000117334 A | 4/2000 |
| JP | 2001038188 A | 2/2001 |
| JP | 2001116437 A | 4/2001 |
| JP | 03478771 | 6/2001 |
| JP | 2001336691 A | 12/2001 |
| JP | 2001343176 | 12/2001 |
| JP | 2004303695 | 10/2004 |
| JP | 2005114015 | 4/2005 |
| JP | 2005164193 | 6/2005 |
| JP | 2005256849 A | 9/2005 |
| JP | 2006077792 A | 3/2006 |
| JP | 2006161945 A | 6/2006 |
| JP | 03792801 B2 | 7/2006 |
| JP | 2007263186 A | 10/2007 |
| JP | 4111096 B2 | 7/2008 |
| JP | 2008157431 A | 7/2008 |
| JP | 2009063064 A | 3/2009 |
| JP | 2009162402 A | 7/2009 |
| JP | 2009524570 A | 7/2009 |
| JP | 2010017437 A | 1/2010 |
| JP | 2010071565 A | 4/2010 |
| JP | 2010108199 A | 5/2010 |
| JP | 2010145002 A | 7/2010 |
| JP | 04545126 B2 | 9/2010 |
| JP | 2010236770 A | 10/2010 |
| JP | 2010276309 A | 12/2010 |
| JP | 2011002033 A | 1/2011 |
| JP | 2011069612 A | 4/2011 |
| JP | 04779684 B2 | 9/2011 |
| JP | 2011196644 A | 10/2011 |
| JP | 4828353 B2 | 11/2011 |
| JP | 2012026493 A | 2/2012 |
| JP | 2012063029 A | 2/2012 |
| JP | 04897473 B2 | 3/2012 |
| JP | 2013195009 A | 3/2012 |
| JP | 2012087993 A | 5/2012 |
| JP | 2012163258 A | 8/2012 |
| JP | 2012189114 A | 10/2012 |
| JP | 2012242075 A | 12/2012 |
| JP | 2013002484 A | 1/2013 |
| JP | 2013050242 A | 3/2013 |
| JP | 2013088036 A | 5/2013 |
| KR | 20020057547 | 7/2002 |
| KR | 20020080938 A | 10/2002 |
| KR | 20030083812 A | 11/2003 |
| KR | 20040000126 | 1/2004 |
| KR | 1020070044024 A | 4/2007 |

(56) References Cited

FOREIGN PATENT DOCUMENTS

| | | |
|---|---|---|
| KR | 1020080103845 | 11/2008 |
| KR | 20090026045 | 3/2009 |
| KR | 1017776 | 2/2011 |
| KR | 20120007241 | 1/2012 |
| KR | 2012046621 | 5/2012 |
| KR | 2012051305 | 5/2012 |
| RU | 2252377 | 5/2005 |
| RU | 2571031 | 12/2015 |
| WO | 9849506 A1 | 11/1998 |
| WO | 9920964 | 4/1999 |
| WO | 0160598 | 8/2001 |
| WO | 0202987 | 1/2002 |
| WO | 0252208 | 4/2002 |
| WO | 03089729 A1 | 10/2003 |
| WO | 2006045694 | 5/2006 |
| WO | 2007085511 A1 | 8/2007 |
| WO | 2009147106 A1 | 12/2009 |
| WO | 2010029730 A1 | 3/2010 |
| WO | 2010043009 A2 | 4/2010 |
| WO | 2010092627 A1 | 8/2010 |
| WO | 2010127947 A3 | 2/2011 |
| WO | 2011058678 A1 | 5/2011 |
| WO | 2011003711 A3 | 6/2011 |
| WO | 2011081498 A3 | 11/2011 |
| WO | 2012023705 A3 | 4/2012 |
| WO | 2012026715 A3 | 6/2012 |
| WO | 2012043990 A3 | 6/2012 |
| WO | 2012044001 A3 | 6/2012 |
| WO | 2012119892 A1 | 9/2012 |
| WO | 2012031885 A3 | 1/2013 |
| WO | 2012085212 A9 | 7/2013 |
| WO | 2014038150 A1 | 3/2014 |
| WO | 2014095542 | 6/2014 |
| WO | 2014184393 A1 | 11/2014 |

OTHER PUBLICATIONS

International Searching Authority, "Search Report," issued in connection with International Patent Application No. PCT/US2016/060947, dated Feb. 2, 2017, 8 pages.
International Searching Authority, "Search Report," issued in connection with International Patent Application No. PCT/US2016/061125, dated Jan. 12, 2017, 9 pages.
International Searching Authority, "Search Report," issued in connection with International Patent Application No. PCT/US2016/062453, dated Feb. 9, 2017, 8 pages.
International Searching Authority, "Search Report," issued in connection with International Patent Application No. PCT/US2016/061790, dated Jan. 26, 2017, 8 pages.
International Searching Authority, "Search Report," issued in connection with International Patent Application No. PCT/US2016/062029, dated Jan. 26, 2017, 8 pages.
International Searching Authority, "Search Report," issued in connection with International patent Application No. PCT/US2016/060961, dated Feb. 2, 2017, 9 pages.
International Searching Authority, "Search Report," issued in connection with International patent Application No. PCT/US2016/020896, dated Aug. 11, 2016, 3 pages.
KitchenAid, "Refrigerator user instructions," Sep. 5, 2015, 120 pages.
BASF, "Balindur™ Solutions for fixing Vaccum Insulated Panels," web page, 4 pages, date unknown, http://performance-materials.basf.us/products/view/family/balindur, at least as early as Dec. 21, 2015.
BASF, "Balindur™," web page, 2 pages, date unknown, http://product-finder.basf.com/group/corporate/product-finder/en/brand/BALINDUR, at least as early as Dec. 21, 2015.
PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.
European Patent Application No. 13775196.2, Supplemental Search Report, Dec. 7, 2015, 10 pages.
European Patent Application No. 14158608.1, Search Report, Sep. 30, 2014, 5 pages.
International Patent Application No. PCT/US2013036203, International Search Report, Jul. 26, 2013, 10 pages.
European Patent Application No. 15154577.9, Search Report, Jul. 20, 2015, 8 pages.
European Patent Application No. 14158619, Search Report, Jun. 22, 2015, 9 pages
European Patent Application No. 15153481, Search Report, Jul. 10, 2015, 6 pages.

* cited by examiner

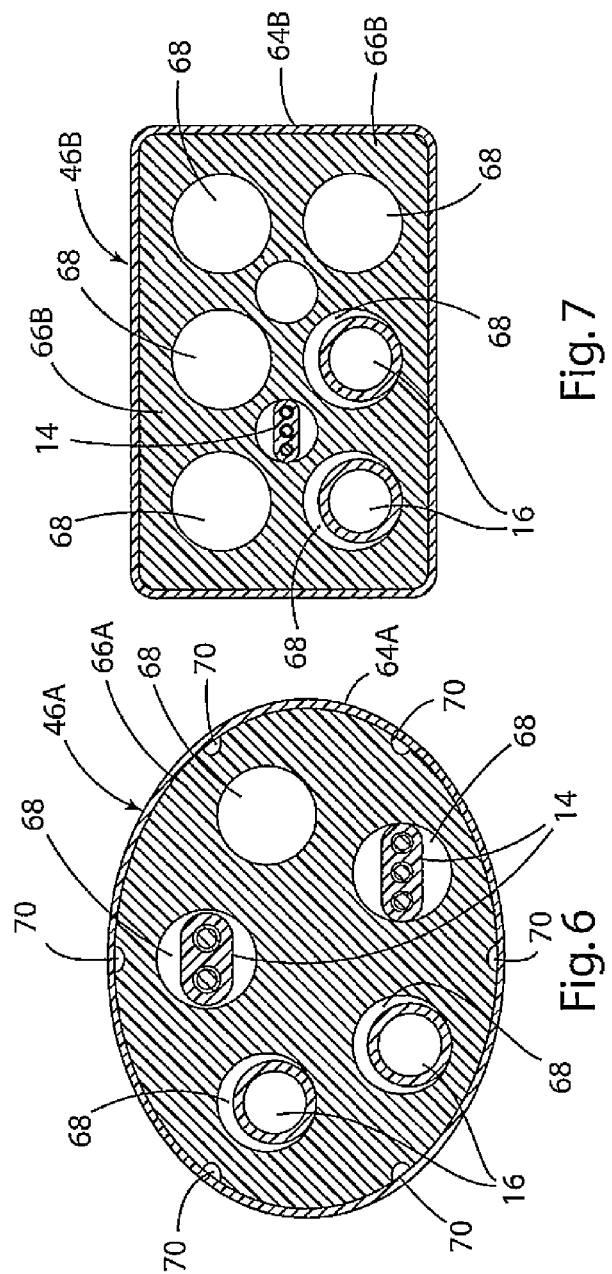

UMBILICAL FOR PASS THROUGH IN VACUUM INSULATED REFRIGERATOR STRUCTURES

BACKGROUND OF THE INVENTION

Various types of insulated cabinets and doors have been developed for refrigerators and the like. Refrigerator doors and/or cabinets may comprise vacuum insulated structures having an outer wrapper that is sealed to an inner liner to form a vacuum cavity that is filled with porous material. Power and/or water lines may need to be run through the insulated structure to provide for various refrigerator components such as ice and water dispensers. However, routing utilizing lines through insulated structures may be problematic.

SUMMARY OF THE INVENTION

A method of routing utility lines in a vacuum insulated refrigerator structure includes forming a shell having an internal cavity. The shell has at least first and second openings to the internal cavity. The method includes forming an elongated umbilical comprising an elongated impervious sleeve and an elongated core structure defining at least two elongated internal passageways extending lengthwise along the umbilical. The method includes sealingly connecting a first end of the sleeve to the shell at the first opening, and sealingly connecting a second end of the sleeve to the shell at the second opening. A vacuum is formed in the internal cavity of the shell. The method further includes routing utility lines through the at least two elongated internal passageways whereby portions of the utility lines are disposed inside the umbilical, and opposite ends of the utility lines extend out of the opposite ends of the umbilical. The utility lines may comprise power and/or water and/or refrigerant and/or control lines or the like.

Another aspect of the present disclosure is a vacuum insulated refrigerator structure including an airtight shell defining an internal vacuum cavity. The vacuum insulated refrigerator structure also includes a tubular umbilical member defining an elongated internal space and having a central portion disposed in the internal vacuum cavity. Opposite end portions of the tubular umbilical member are sealingly connected to the airtight shell. Each opposite end portion has an opening that permits access to the elongated internal space from outside of the airtight shell. The vacuum insulated refrigerator structure further includes an elongated internal core structure disposed within the elongated internal space and having opposite ends disposed adjacent the openings at the opposite ends of the tubular umbilical member. The internal core structure has at least first and second elongated internal passageways. First and second utility lines are disposed in the first and second elongated internal passageways, respectively. The first and second utility lines have opposite ends extending out of the openings at the opposite ends of the tubular umbilical member.

These and other features, advantages, and objects of the present disclosure will be further understood and appreciated by those skilled in the art by reference to the following specification, claims, and appended drawings.

BRIEF DESCRIPTION OF THE DRAWINGS

FIG. 6 is a cross sectional view of an umbilical according to another aspect of the present disclosure; and FIG. 7 is a cross sectional view of an umbilical according to another aspect of the present invention.

DETAILED DESCRIPTION

Figure 1:
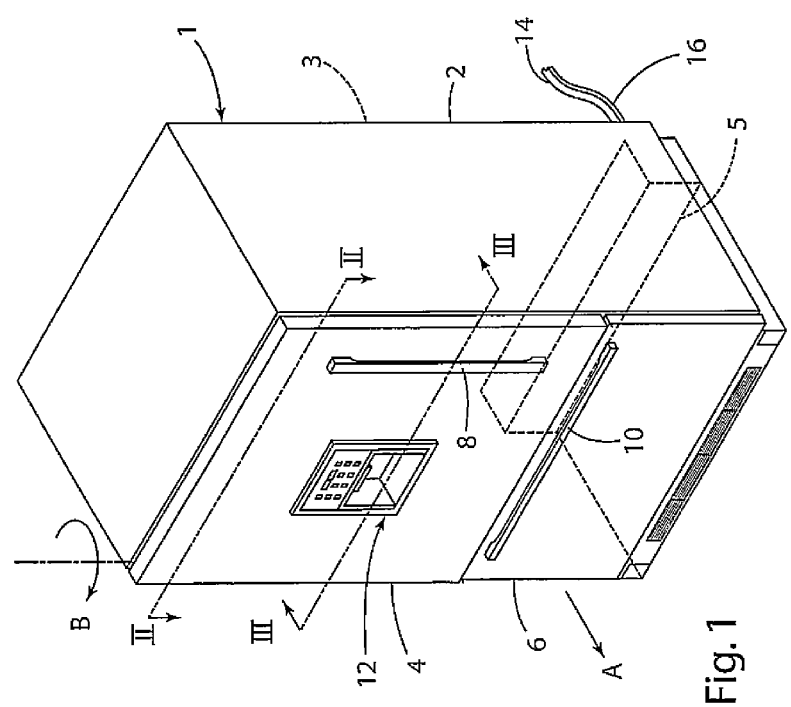
FIG. 1 is an isometric view of a refrigerator according to one aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
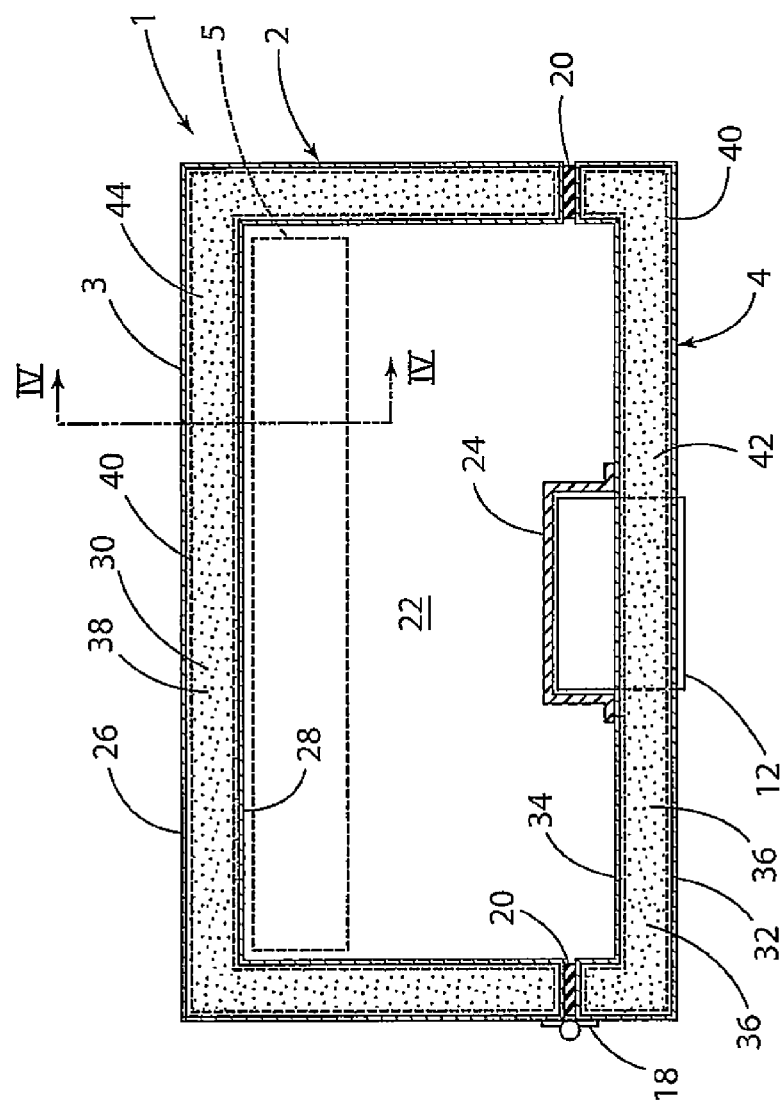
FIG. 2 is a partially schematic cross sectional view of the refrigerator of FIG. 1 taken along the line II-II.

With reference to FIG. 1, a refrigerator 1 according to one aspect of the present disclosure includes an insulated cabinet 2 having an insulated/refrigerated interior space 22 (FIG. 2) and front doors 4 and 6. Door 4 includes a handle 8, and door 6 includes a handle 10. Door 4 may be movably mounted to cabinet 2 by one or more hinges 18 (FIG. 2). In the illustrated example, the door 6 comprises a drawer that can be translated linearly as indicated by the arrow "A." Door 4 is rotatably mounted to the cabinet 2 by hinges or the like in a known manner, and rotates about a vertical axis as indicated by the arrow "B." Refrigerator 1 may include additional doors (not shown) in various shapes and configurations as may be required for a particular application. Refrigerator 1 may include a conventional powered cooling system (not shown) that is mounted in machine compartment 5. The cooling system may include a compressor, condenser, evaporator, and other related components that cool one or more refrigerated and/or freezer compartments. Alternatively, refrigerator 1 may include a thermoelectric cooling system.

Figure 4:
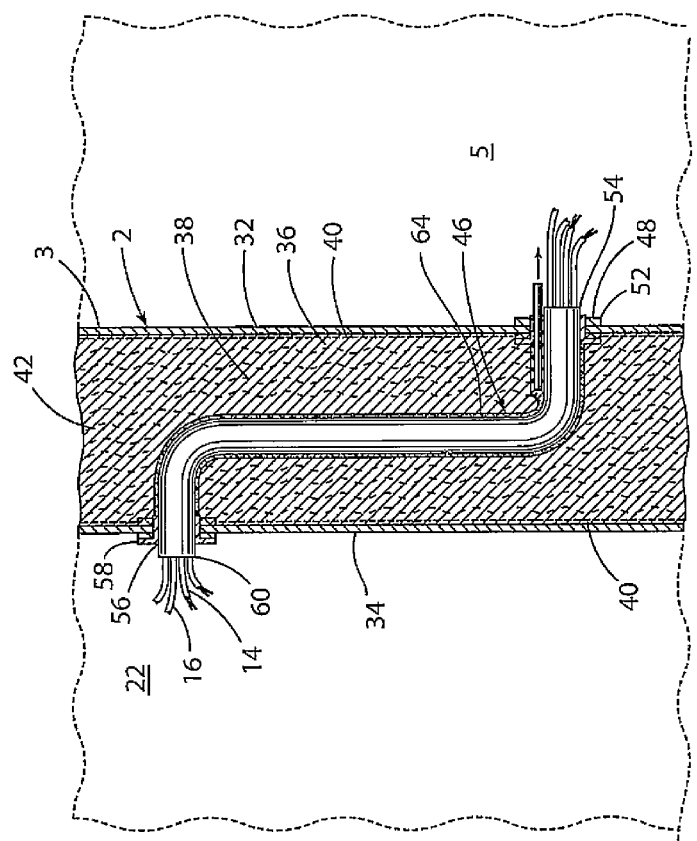
FIG. 4 is a partially schematic fragmentary cross sectional view of a portion of the refrigerator of FIG. 2 taken along the line IV-IV.

An ice/water dispensing unit 12 is mounted in door 4. Power and/or water lines 14 and 16 may be operably connected to the ice/water dispenser 12 or other components. The refrigerator 1 may include a machine compartment 5 that houses various cooling system components (not shown) outside of a refrigerated compartment 22 (FIG. 2). As discussed in more detail below, power and/or water lines 14 and 16 may be routed through a back wall 3 of cabinet 2 utilizing an umbilical 46 (FIG. 4). Lines 14 and/or 16 may also comprise refrigerant lines and/or control lines.

With further reference to FIG. 2, one or more seals 20 are utilized to seal fresh food compartment 22 when door 4 is in a closed position. Ice/water dispenser 12 may be at least partially disposed within an inner structure 24 mounted to door 4. Cabinet 2 may include an outer wrapper member 26, an inner liner member 28, and vacuum core material 30. Liner 28 may be made of thermoformed polymer material or from sheet metal that is bent/formed. Similarly, door 4 may include an outer door panel wrapper member 32, inner liner 34, and vacuum core material 36. The inner and outer members 26, 28, 32, and 34 may comprise polymer or metal that is impervious to gasses to permit formation of a vacuum. As discussed in more detail below, the vacuum cores 30 and 36 may comprise a porous/permeable filler material such as silica powder 38. Filler 30 and 38 may optionally be disposed within an impermeable envelope 40. Filler 30 and/or 38 may comprise various porous/permeable filler materials such as open cell foam, glass fibers, or other suitable materials. The construction of the liners 28 and 34, wrappers 26 and 32, and vacuum core material 36 may be substantially similar to known vacuum insulated refrigerator structures. In general, an interior space 42 of door 4, and an interior space 44 of cabinet 2 comprise a sealed space which is filled with core material 30 and 38, and a vacuum is then formed in spaces 42 and 44 during the process of fabricating the cabinet 2 and door 4.

Figure 3:
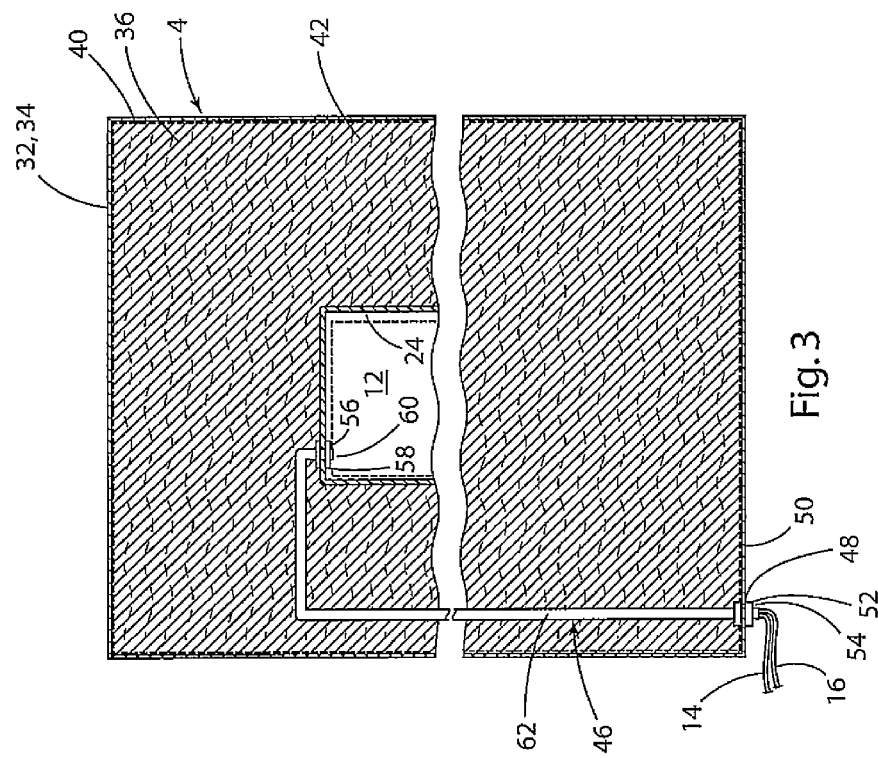
FIG. 3 is a partially schematic fragmentary view of the refrigerator of FIG. 1 taken along the line III-III.

With further reference to FIG. 3, power lines 14 and/or water lines 16 may be routed through a conduit such as umbilical 46 to provide water and/or power to the ice/water dispenser 12. Conduit or umbilical 46 is configured to permit routing of utility lines while maintaining a vacuum in the cabinet 2 and/or door 4. In the illustrated example, a first opening 48 is formed in a lower edge portion 50 of door 4. Wrapper 32 and liner 34 may comprise separate components that overlap along lower edge 50, and the opening 48 may extend through outer wrapper 32 and/or inner liner 34. A first fitting 52 provides an airtight seal at first end 54 of umbilical 46. A second opening 56 is provided through inner structure 24 at ice/water dispenser 12. In the illustrated example, the inner structure 24 comprises an impermeable barrier to maintain the vacuum within interior space 42. A second fitting 58 provides a sealing connection at second end 60 of umbilical 46. As discussed in more detail below, umbilical 46 includes an elongated internal passageway 62 that is generally at atmospheric pressure to thereby permit routing of power lines 14 and/or water lines 16 through the interior space 42 of door 4 without forming leaks that would otherwise destroy the vacuum in interior space 42. It will be understood that the shape and location of umbilical 46 may vary depending upon the requirements of a particular application, and the configuration of FIG. 3 is merely an example of one possible configuration.

Figure 5:
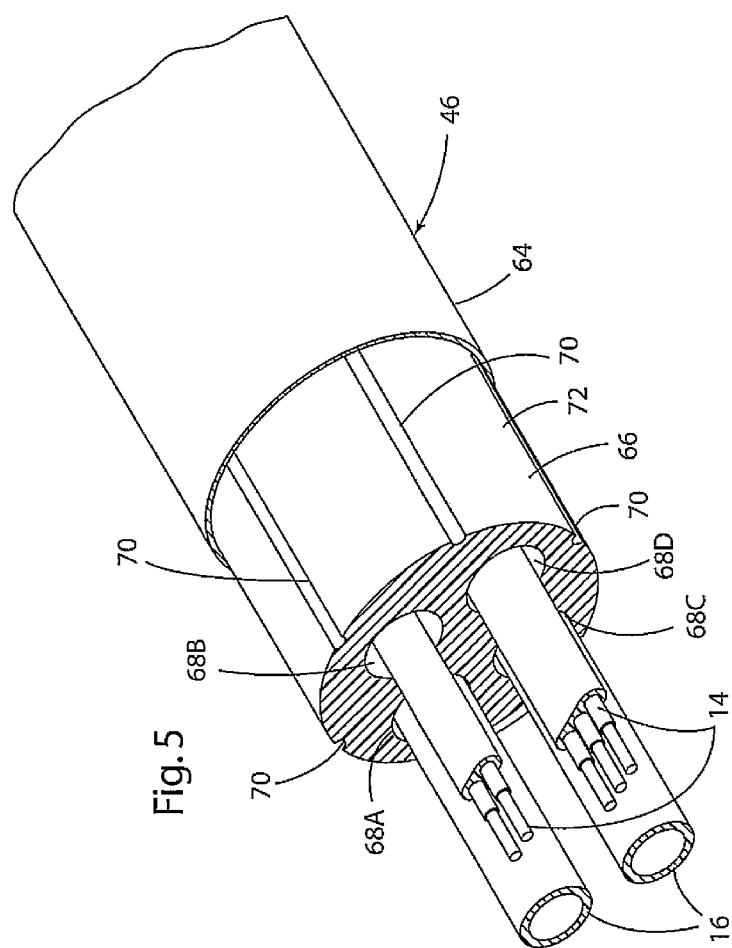
FIG. 5 is a fragmentary isomeric view of an umbilical according to one aspect of the present disclosure.

With further reference to FIG. 4, umbilical 46 may be routed through door 4, door 6, and/or cabinet 2 as required for a particular application. In FIG. 4, umbilical 46 extends through back wall 3 of cabinet 2 between machine compartment 5 and fresh food compartment 22. With reference to FIG. 5, umbilical 46 includes a tubular outer casing 64 and an inner spacer 66 that is disposed within the outer casing 64. Inner spacer 66 includes a plurality of elongated internal passageways 68A-68D through which utility lines such as power lines 14 and/or water lines 16 are routed. Inner spacer 66 is preferably formed from polyurethane foam or other insulating material to prevent or reduce heat transfer to/from utility lines 14 and 16 into/from the outside of the refrigerator. The outer casing 64 may comprise a metal or plastic conduit. The outer casing 64 is preferably impermeable to air to thereby ensure that a vacuum is maintained within the interior space 42 of door 4. Thus, if outer casing 64 comprises a polymer material, casing 64 may include one or more layers of polymer that are impermeable to gasses. The spacer 66 may comprise an insulation material such as EPS or PU foam. One or more grooves 70 may be formed in outer surface 72 of spacer 66. The umbilical 46 may have a generally circular cross sectional shape as shown in FIG. 5.

With further reference to FIG. 6, an umbilical 46A according to another aspect of the present disclosure has a generally oval or elliptical cross sectional shape, and includes a non-circular outer casing 64A. A non-circular (e.g. oval or elliptical) inner spacer 66A includes a plurality of internal passages 68 for routing power lines 14 and/or water lines 16.

With further reference to FIG. 7, an umbilical 46B according to another aspect of the present disclosure has a generally rectangular cross sectional shape including an outer casing 64B, and an inner spacer 66B having a plurality of passageways 68 that provide for routing of power lines 14 and/or water lines 16.

During assembly, the outer casing 64 is fabricated from metal or impermeable polymer material. The inner spacer 66 is then inserted into outer casing 64. The power lines 14 and/or water lines are then inserted into the passageways 68 through inner spacer 66. The opposite ends of the outer casing 64 are then sealingly attached to the outer wrapper 34 and/or inner liner 34 (FIG. 4). The opposite ends of outer casing 64 may be sealed to wrapper 34 and/or inner liner 34 utilizing adhesive sealants and/or fittings 52 and 58. Alternatively, if outer casing 64 is metal, the outer casing 64 may be welded to wrapper 32 and/or liner 34 if wrapper 32 and liner 34 are made from a compatible metal that is suitable for welding. The wrapper 32 and liner 34 are then assembled together, and silica material or powder 38 is then positioned between the wrapper 32 and liner 34. A vacuum is then applied to the interior space 42, and the interior space is then sealed to form a vacuum therein.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method of routing utility lines in a vacuum insulated refrigerator structure, the method comprising:
    forming a shell having an internal cavity, the shell having at least first and second openings to the internal cavity;
    forming an elongated non-linear umbilical having at least one bend, the umbilical comprising an elongated impervious sleeve and an elongated core structure disposed inside the sleeve, wherein the core structure defines at least two elongated internal passageways extending lengthwise along the umbilical, surrounding the core structure;
    sealingly connecting a first end of the sleeve to the shell at the first opening;
    sealingly connecting a second end of the sleeve to the shell at the second opening;
    forming a vacuum in the internal cavity of the shell; and
    routing utility lines through the at least two elongated internal passageways whereby portions of the utility lines are disposed inside the umbilical, and opposite ends of the utility lines extend out of opposite ends of the umbilical.

2. The method of claim 1, wherein:
    the vacuum insulated refrigerator structure comprises a refrigerator door including a dispensing unit that is accessible from an outer side of the refrigerator door, wherein the dispensing unit is configured to dispense at least one of ice and liquid water;

the utility lines include at least one water line that is connected to the dispensing unit, and at least one electrical line that is connected to the dispensing unit.

3. The method of claim 2, wherein:
the shell includes a liner having a peripheral edge that is sealed to a peripheral edge of a wrapper.

4. The method of claim 3, wherein:
the liner is formed by thermoforming a sheet of polymer or by bending sheet metal;
the wrapper is formed by bending the sheet metal.

5. The method of claim 1, wherein:
the sleeve has cylindrical inner and outer surfaces.

6. The method of claim 1, wherein:
the sleeve has rectangular inner and outer surfaces.

7. The method of claim 1, wherein:
the sleeve has elliptical inner and outer surfaces.

8. The method of claim 1, wherein:
the sleeve comprises an impermeable polymer material.

9. The method of claim 1, wherein:
the sleeve comprises a metal material.

10. The method of claim 1, wherein:
the elongated core structure comprises a foam material.

11. The method of claim 1, wherein:
the elongated core structure comprises a polymer material.

12. The method of claim 1, wherein:
the first end of the sleeve is sealingly connected to the shell at the first opening by an adhesive.

13. The method of claim 12, including:
providing a fitting;
utilizing the fitting to sealingly connect the first end of the sleeve to the shell.

14. The method of claim 1, wherein:
the first end of the sleeve is welded and/or glued to the shell.

15. The method of claim 1, wherein:
the elongated core structure is inserted into the sleeve before the first and second ends of the sleeve are sealingly connected to the shell.

16. The method of claim 1, wherein:
the shell comprises a liner and a wrapper that are interconnected around a perimeter of the vacuum insulated refrigerator structure during assembly to form a substantially impervious structure;
the first and second ends of the sleeve are sealingly connected to the shell before the liner and wrapper are assembled.

17. The method of claim 1, wherein:
the utility lines are inserted into the elongated internal passageways of the core structure before the first and/or second ends of the sleeve are connected to the shell.

18. A vacuum insulated refrigerator structure comprising:
an airtight shell defining an internal vacuum cavity;
a tubular umbilical member defining an elongated non-linear internal space having at least one bend, and having a central portion disposed in the internal vacuum cavity, and opposite end portions that are sealingly connected to the airtight shell, each opposite end portion having an opening that permits access to the elongated internal space from outside of the airtight shell;
an elongated internal core structure disposed within the elongated internal space and having opposite ends disposed adjacent the openings at the opposite ends of the tubular umbilical member, the internal core structure having at least first and second elongated internal passageways;
first and second utility lines disposed in the first and second elongated internal passageways, respectively, and having opposite ends extending out of the openings at the opposite ends of the tubular umbilical member.

19. The vacuum insulated refrigerator structure of claim 18, wherein:
the tubular umbilical member comprises a multi-layer polymer material including a barrier layer that is substantially impervious to at least one gas.

20. The vacuum insulated refrigerator structure of claim 18, including:
porous filler material disposed in the vacuum cavity.

* * * * *